(12) United States Patent
Katsumata et al.

(10) Patent No.: US 6,361,197 B1
(45) Date of Patent: Mar. 26, 2002

(54) VEHICULAR LAMP

(75) Inventors: Toshiyuki Katsumata; Junji Takeshima, both of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/548,859

(22) Filed: Apr. 13, 2000

(30) Foreign Application Priority Data

May 11, 1999 (JP) .......................................... 11-129459

(51) Int. Cl.[7] ................................................. B60Q 1/24
(52) U.S. Cl. ........................ 362/546; 362/505; 362/370
(58) Field of Search ................................ 362/479, 488, 362/490, 493, 505, 546, 549, 364, 365, 370, 432

(56) References Cited

U.S. PATENT DOCUMENTS

| 3,708,850 A | * | 1/1973 | Martin ........................ 362/364 |
| 4,212,051 A | * | 7/1980 | Kulik .......................... 362/369 |
| 5,239,449 A | * | 8/1993 | Wnuk et al. ................. 362/365 |
| 5,743,617 A | | 4/1998 | Sato et al. |

* cited by examiner

Primary Examiner—Y. My Quach-Lee
(74) Attorney, Agent, or Firm—Fish & Richardson P.C.

(57) ABSTRACT

A vehicular lamp is inserted into an opening in a side panel of a vehicle without significantly protruding from the surface of the side panel and without reducing the strength of the side pane.

8 Claims, 5 Drawing Sheets

VEHICULAR LAMP

BACKGROUND OF THE INVENTION

A vehicular lamp such as a fog lamp or a rear fog lamp is often mounted to a side panel of a vehicle such as a bumper with an opening for mounting a lighting fixture. As shown in FIG. 1, a vehicular lamp 2 is inserted into an opening 200a, and bracket portions 2a formed at lateral ends of the vehicular lamp 2 are secured to a side panel 200 by fastening screws 4 with the bracket portions 2a abutting on the side panel 200. Thereby, the vehicular lamp 2 is mounted on the side panel 200. In FIG. 1, apertures 200b for inserting and attaching grommets are formed in the vicinity of the lateral ends of the opening 200a in the side panel 200. The fastening screws 4 are secured to grommets 6, which are attached by inserting them into the apertures 200b.

To mount the conventional vehicular lamp 2 to the side panel 200, the apertures 200b need to be formed in the side panel 200. However, the apertures 200b reduce the strength of the side panel 200. Also, since the surface (designed surface) of a front lens 8 of the vehicular lamp 2 protrudes far above the surface of the side panel 200, this protrusion disfigures the peripheral portion of the side panel 200.

SUMMARY OF THE INVENTION

The present invention is presented in view of those problems described above. The present invention provides a vehicular lamp which can be mounted to a rear bumper having an opening for mouting the lamp without reducing the strength of the rear bumper or disfiguring the periphery of a mounting portion of the rear bumper.

The vehicular lamp of the present invention, which is mounted to a side panel of a vehicle having an opening for mounting the lamp, comprises a lamp unit having a light source, a lamp body supporting the light source, a front lens disposed forwardly of the lamp body, and a unit fixture with which the lamp unit is inserted into the opening to be mounted to the side panel. The unit fixture comprises an inner bracket having a frame-like portion formed to encircle the lamp unit along the contour of the opening for mounting the lamp unit, an outward flange formed at a front end of the frame-like portion, an outer bracket having a frame-like portion encircling the frame-like portion of the inner bracket, and an outward flange formed at a front end of the frame-like portion. The brackets are fastened together to the lamp unit by fastening screws, with the side panel being sandwiched on its front and back sides between the outward flange of the inner bracket and the outward flange of the outer bracket so that the lamp unit is mounted to the side panel.

The outward flanges of the inner and outer brackets indicate a flange portion formed to be bent towards the outer periphery from the frame-like portion. Each of these outward flanges may be formed along either the entire circumference of the frame-like portion or part of it.

With the side panel being sandwiched on its front and back sides between the outward flange of the inner bracket and the outward flange of the outer bracket, the brackets are fastened together with the lamp unit by the fastening screws, whereby the lamp unit is mounted to the side panel. Therefore, there is no need to form apertures in the side panel for fixing the fastening screws as required in the conventional art. Also, the lamp unit can be mounted to the side panel without letting the surface (designed surface) of the front lens of the lamp unit protrude far above the surface of the side panel. The present invention enables the vehicular lamp to be mounted to the side panel without reducing the strength of the side panel or disfiguring the periphery of a mounting portion of the side panel.

The lamp unit may be preassembled before it is mounted to the side panel with the unit fixture. However, if the lamp body and the front lens are designed to be simultaneously fastened during the fastening of the screws used in mounting the lamp unit to the side panel, the man-hour for assembling the lighting fixture can be reduced by employing the present invention.

In the aforementioned construction, the surface of the front lens is formed to be substantially coplanar with the surface of the outward flange of the inner bracket or the outer bracket, and the lamp unit can be disposed along the surface contour of the side panel. This enhances the appearance of the of the side panel.

Moreover, in the aforementioned construction, the inner and outer brackets can engage with each other by the protrusions provided on the inner bracket fitting into the apertures provided on the outer bracket. When the brackets are engaged, the side panel is sandwiched on its front and back sides between the outward flange of the inner bracket and the outward flange of the outer bracket. The brackets can be provisionally held in place by this engagement in mounting the lamp unit to the side panel. Thus, it is possible to facilitate the fastening of the screws and thereby improve the workability in mounting the vehicular lamp to the side panel.

DESCRIPTION OF THE EMBODIMENTS

An embodiment of the present invention will be described with reference to the drawings.

Figure 1:
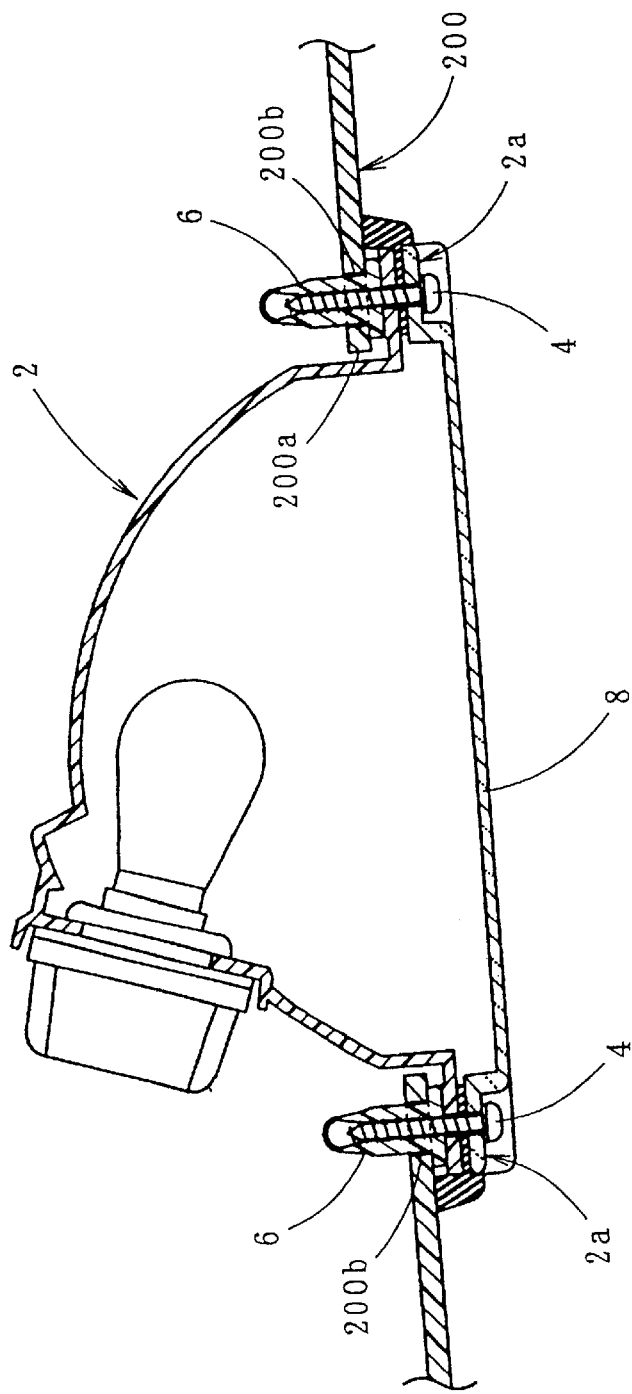
FIG. 1 shows a conventional example.
Figure 2:
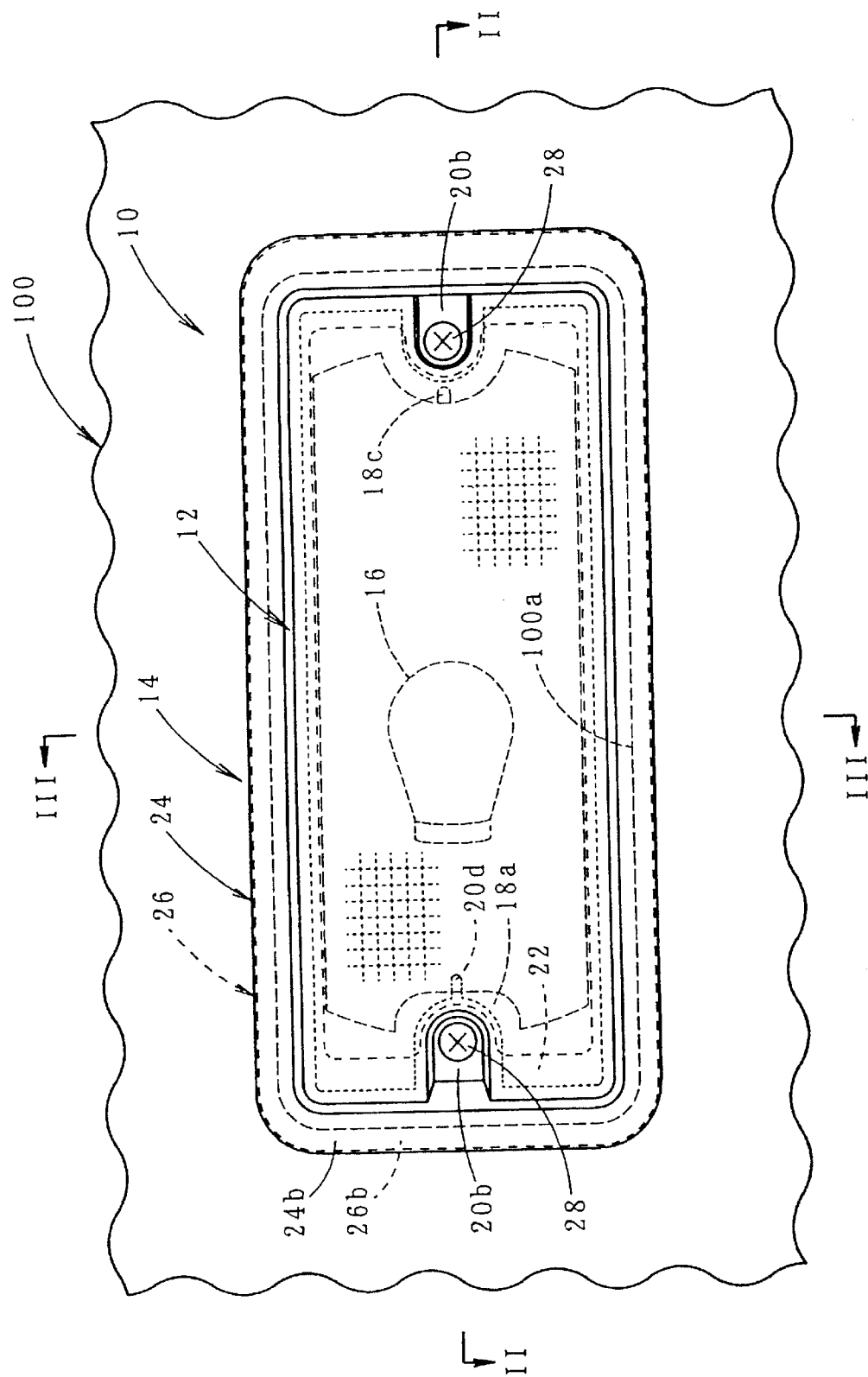
FIG. 2 shows a front view of a vehicular lamp according to one embodiment of the present invention.
Figure 3:
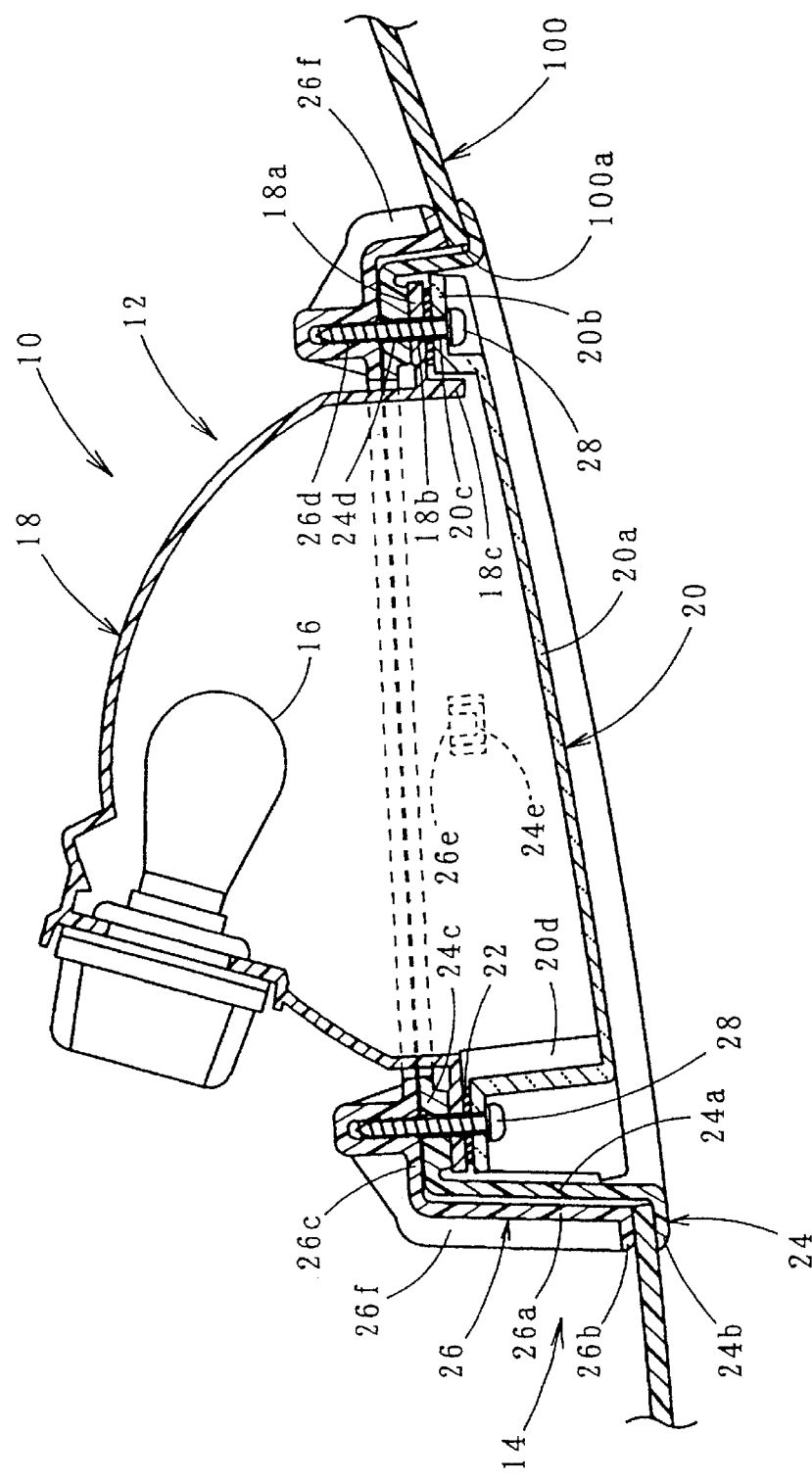
FIG. 3 is a sectional view taken along a line II—II shown in FIG. 2.
Figure 4:
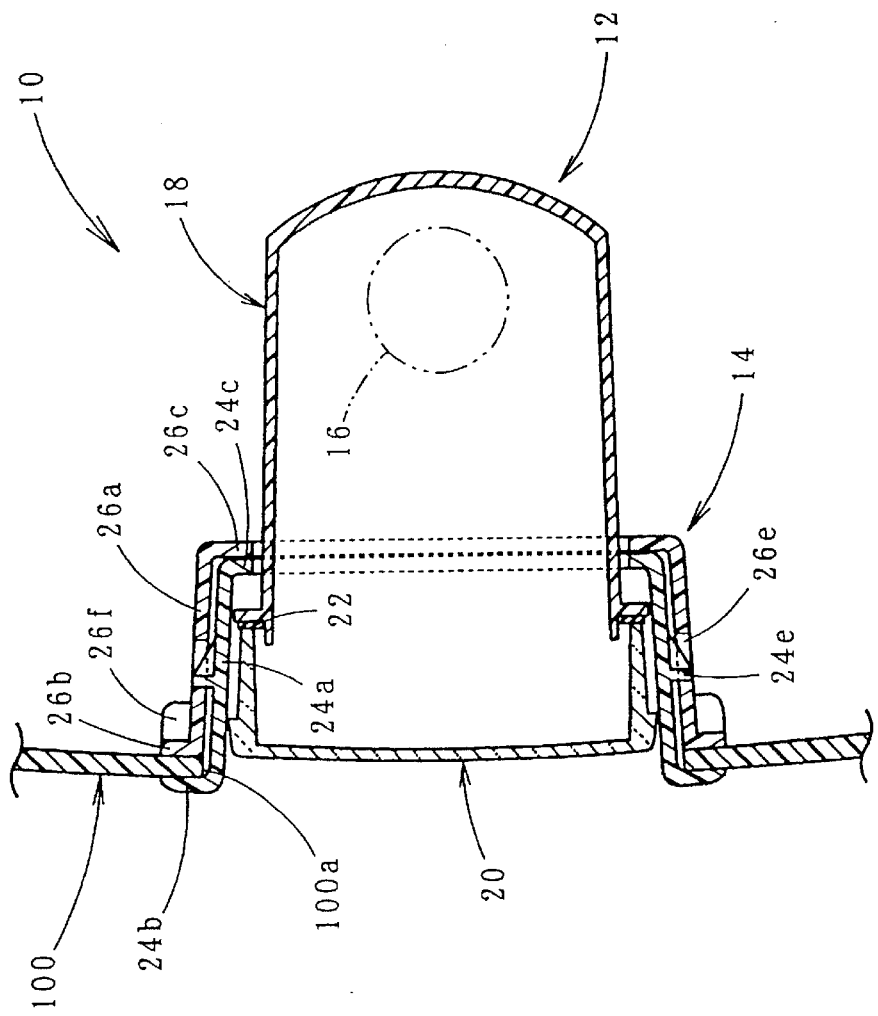
FIG. 4 is a sectional view taken along a line III—III shown in FIG. 2.

FIG. 2 is a front view of a vehicular lamp 10 according to one embodiment of the present invention, and FIGS. 3 and 4 are sectional views taken along lines II—II and III—III respectively.

As shown in these drawings, the vehicular lightning fixture 10 of this embodiment is a rear fog lamp mounted to a rear bumper 100 (vehicle body panel) of a vehicle body having a lighting fixture mounting opening 100a of a generally rectangular oblong shape.

This vehicular lamp 10 comprises a lamp unit 12 and a unit fixture 14 by which the lamp unit 12 is inserted into the lighting fixture mounting opening 100a to be mounted to the rear bumper 100.

The lamp unit 12 comprises a light source bulb 16, a lamp body 18 supporting the light source bulb 16, a front lens 20 disposed forwardly of the lamp body 18, and a seat packing 22 interposed between the lamp body 18 and the front lens 20. The lamp unit 12 is fixed to the unit fixture 14 by fastening screws 28. The front lens 20 is disposed forwardly with respect to the lighting fixture but backwardly with respect to the vehicle. The same will hold true hereinafter.

Mounting flange portions 20b are formed at left and right ends of the front lens 20 to be located backwardly of a lens body portion 20a of the front lens 20. Meanwhile mounting flange portions 18a, which abut on the mounting flange portions 20b through the seat packing 22, are formed at left and right ends of the lamp body 18. The mounting flange portions 18a of the lamp body 18 and the mounting flange portions 20b of the front lens 20 respectively have insertion apertures 18b and 20c through which the fastening screws 28 are inserted.

While an adverse mounting preventing boss 18c is formed on the front end surface of the lamp body 18 at one lateral end, an adverse mounting preventing rib 20d is formed on the inner surface of the front lens 20 at the opposite end. The boss 18c and the rib 20d serve to prevent the front lens 20 from being mounted laterally or inversely to the lamp body 18.

The unit fixture 14 comprises an inner bracket 24 and an outer bracket 26. The inner bracket 24 comprises a frame-like portion 24a formed to encircle the lamp unit 12 along the contour of an opening edge of the lighting fixture mounting opening 100a, an outward flange 24b formed at the front end of the frame-like portion 24a, and an inward flange 24c formed at the rear end of the frame-like portion 24a. On the other hand, the outer bracket 26 comprises a frame-like portion 26a encircling the frame-like portion 24a of the inner bracket 24, an outward flange 26b formed at the front end of the frame-like portion 26a, and an inward flange 26c formed at the rear end of the frame-like portion 26a.

In the construction of the vehicular lamp 10 of the present invention, the inner bracket 24 and the outer bracket 26 are fastened together with the lamp unit 12 by the fastening screws 28, with the rear bumper 100 being sandwiched on its front and back sides between the outward flange 24b of the inner bracket 24 and the outward flange 26b of the outer bracket 26, whereby the lamp unit 12 is mounted to the rear bumper 100.

An engagement aperture 24d, which the fastening screw 28 engages, is formed in the inward flange 24c of the inner bracket 24. A tap aperture 26d into which the fastening screw 28 is securely screwed is formed in the inward flange 26c of the outer bracket 26. In mounting the lamp unit 12 to the rear bumper 100, the inward flange 24c of the inner bracket 24 is superimposed on the inward flange 26c of the outer bracket 26, and the mounting flange portions 18a of the lamp body 18 are superimposed on the mounting flange portions 20b of the front lens 20. In this state, the fastening screw 28 is securely screwed into the tap aperture 26d of the inward flange 26c through the insertion apertures 18b of the mounting flange portion 18a, the insertion aperture 20c of the mounting flange portion 20b, and the engagement aperture 24d of the inward flange 24c.

The outward flange 26b of the outer bracket 26 is formed so that its surface is substantially coplanar with the surface of the lens body portion 20a of the front lens 20. The outward flange 24b of the inner bracket 24 is formed to be located forwardly of the outward flange 26b of the outer bracket 26 by a distance approximately equal to a thickness of the rear bumper 100.

A pair of lances 24e are formed substantially at the lateral center in upper and lower walls of the frame-like portion 24a of the inner bracket 24. Lance engagement apertures 26e are formed substantially at the lateral center in upper and lower walls of the frame-like portion 26a of the outer bracket 26. Each of the lances 24e is generally U-shaped in a plan view and formed to slant backwardly and downwardly. Meanwhile each of the lance engagement apertures 26e is formed as a rectangular aperture greater than the lances 24e in lateral width. These lances 24e are designed to engage the lance engagement apertures 26e when the rear bumper 100 is sandwiched on its front and back sides between the outward flange 24b of the inner bracket 24 and the outward flange 26b of the outer bracket 26.

A plurality of reinforcement ribs 26f are formed on the outer peripheral surface of the outer bracket 26. This makes it possible to securely sandwich the rear bumper 100 on its front and back sides between the outward flange 24b of the bracket 24 and the outward flange 26b of the bracket 26.

Figure 5:
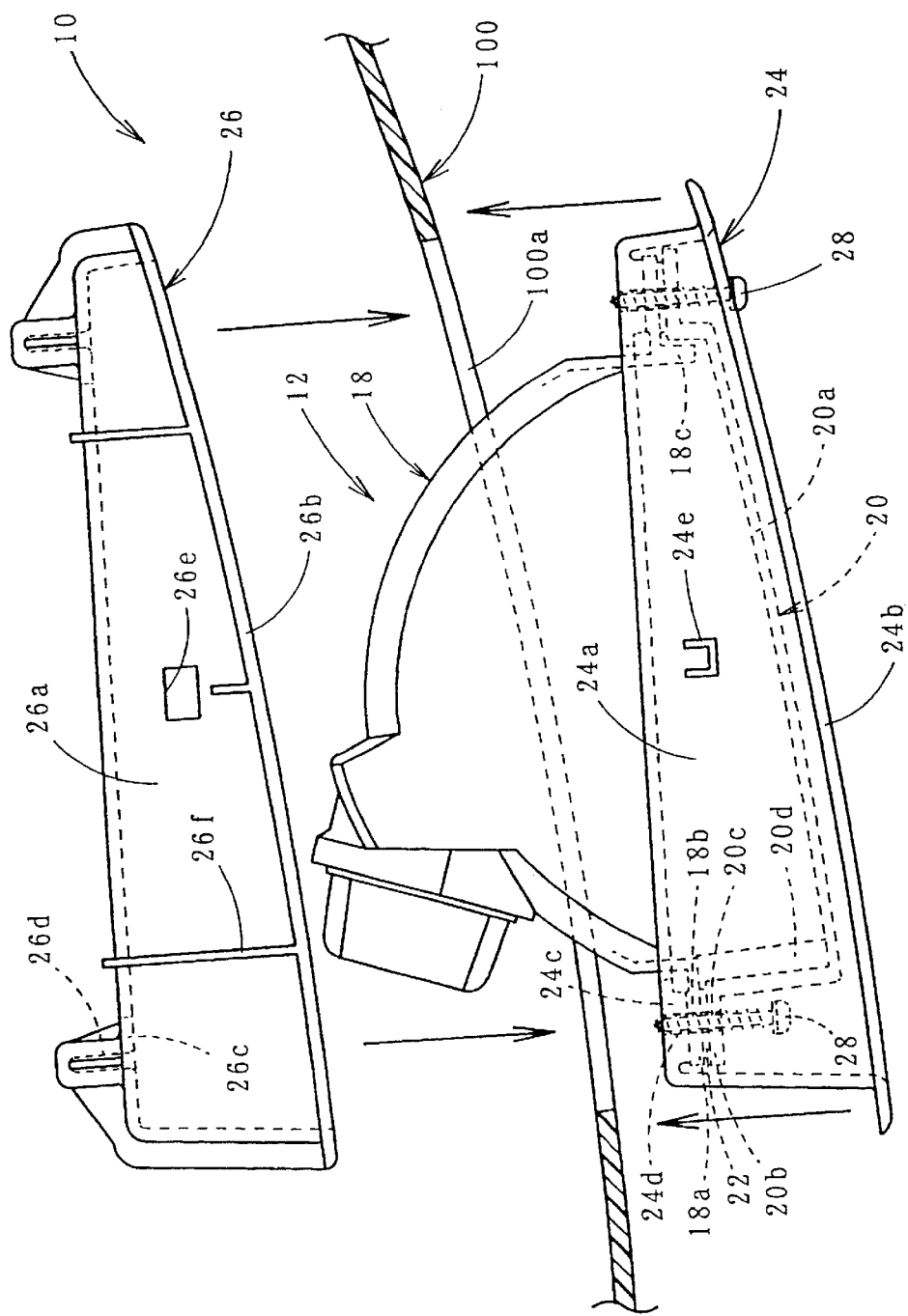
FIG. 5 is a plan view showing how the vehicular lamp is mounted to a rear bumper.

FIG. 5 is a plan view showing how the vehicular lamp 10 is mounted to the rear bumper 100.

As shown in the drawing, when the lamp unit 12 is mounted to the rear bumper 100, the mounting flange portion 18a of the lamp body 18 and the mounting flange portion 20b of the front lens 20 are first superimposed on the inward flange 24c of the inner bracket 24. The fastening screw 28 is then engaged with the engagement aperture 24d of the inward flange 24c through the insertion aperture 18b in the mounting flange portion 18a and the insertion aperture 20c in the mounting flange portion 20b. The leading end of the fastening screw 28 slightly protrudes above the engagement aperture 24d.

In this state, the frame-like portion 24a of the inner bracket 24 is inserted into the lighting fixture mounting opening 100a from outside the vehicle. The outward flange 24b of the inner bracket 24 is made to abut on a portion around the lighting fixture mounting opening 100a in the rear bumper 100.

The frame-like portion 26a of the outer bracket 26 is mounted to cover the inner bracket 24 from inside the vehicle. The outward flange 26b of the outer bracket 26 is made to abut on the portion around the lighting fixture mounting opening 100a in the rear bumper 100. At this moment the respective lances 24e of the inner bracket 24 engage the lance engagement apertures 26e of the outer bracket 26. The brackets 24 and 26 are provisionally fixed with the rear bumper 100 being sandwiched on its front and back sides therebetween.

After that, a pair of fastening screws 28 are securely screwed into the tap apertures 26d in the inward flange 26c of the outer bracket 26. Thereby the rear bumper 100 is sandwiched on its front and back sides between the outward flange 24b of the inner bracket 24 and the outward flange 26b of the outer bracket 26. Also, the lamp unit 12 is fixed to the brackets 24 and 26, whereby the lamp unit 12 is mounted to the rear bumper 100.

As has been described in detail, the vehicular lamp 10 of this embodiment has the unit fixture 14 for mounting the lamp unit 12 to the rear bumper 100. With the rear bumper 100 being sandwiched on its front and back sides between the outward flange 24b of the inner bracket 24 and the outward flange 26b of the outer bracket 26 of the unit fixture 14, the brackets 24 and 26 are fastened together with the lamp unit 12 by the fastening screws 28, whereby the lamp unit 12 is mounted to the rear bumper 100. Therefore, there is no need to form apertures for fixing the fastening screws in the rear bumper 100 as in the case of the conventional art. The lamp unit 12 can be mounted to the rear bumper 100 without letting the surface (designed surface) of the front lens 18 of the lamp unit 12 protrude far above the surface of the rear bumper 100.

Thus, according to this embodiment, the vehicular lamp 10 can be mounted to the rear bumper 100 without reducing the strength of the rear bumper 100 or disfiguring the periphery of the mounting portion of the rear bumper 100.

Besides, in this embodiment, the lamp body 18 and the front lens 20, which constitute the lamp unit 12, are simultaneously fastened by the fastening screws 28 which are used in mounting the lamp unit 12 to the rear bumper 100. Therefore, the man-hour for assembling the lighting fixture can be reduced.

In this embodiment, the surface of the lens body 20a of the front lens 20 is formed to be substantially coplanar with the surface of the outward flange 26a of the outer bracket 26. Therefore, the lamp unit 12 is disposed along the surface contour of the rear bumper 100, whereby the appearance of the periphery of the lighting fixture mounting portion of the rear bumper 100 can be enhanced. Also, in the case where the surface of the lens body 20a of the front lens 20 is formed to be substantially coplanar with the outward flange 24a of the inner bracket 24, the lamp unit 12 is disposed along the surface contour of the rear bumper 100. Therefore, similar operation and effect can be achieved.

In addition, according to this embodiment, when the rear bumper 100 is sandwiched on its front and back sides between the outward flange 24b of the inner bracket 24 and the outward flange 26b of the outer bracket 26, the brackets 24 and 26 are engaged with each other by the lances 24e in the apertures 26e. Therefore, when the lamp unit 12 is mounted to the rear bumper 100, the brackets 24 and 26 can be provisionally fixed by the engagement. Thus, it is possible to facilitate the fastening operation with the fastening screws 28 and thereby improve the workability in mounting the vehicular lamp 10 to the rear bumper 100.

In this embodiment, the mounting flange portions 20b of the front lens 20 are formed to be located backwardly of the lens body portion 20a of the front lens 20. Therefore, it is possible to prevent the heads of the fastening screws 28 from protruding above the lens body portion 20a to the extent of destroying the beauty.

In this embodiment, the vehicular lamp 10 is designed to be fastened at its left and right ends by the fastening screws 28. However, as long as the vehicular lamp 10 is fastened at least one location by the fastening screw 28, it is possible to adopt another arrangement for performing the fastening operation by the fastening screws 28.

Although this embodiment described the vehicular lamp 10 as being a rear fog lamp, the lamp 10 could be other vehicular lamps and headlamps such as a fog lamp with similar operations and effects of the embodiment.

In addition, this embodiment described the side panel as being the rear bumper 100, the side panel could be a vehicle body panel itself with similar operations and effects of the embodiment.

Other implementations are within the scope of the following claims.

What is claimed is:

1. A vehicular lamp mounted to a side panel of a vehicle, comprising:

a light source;

a lamp body supporting the light source;

a lamp unit comprising the lamp body and a front lens disposed forwardly of the lamp body; and a unit fixture together with the lamp unit is inserted into an opening in the side panel, the unit fixture comprising an inner bracket having a first frame-like portion with an outward flange following the contour of the opening, and an outer bracket having a second frame-like portion with an outward flange following the contour of the opening, the lamp unit being disposed inside the first and second frame-like portions;

wherein the outer and inner brackets and the lamp unit are fastened together, and an edge of the side panel at the opening is sandwiched between the outward flange of the inner bracket and the outward flange of the outer bracket to mount the lamp unit to the side panel.

2. The vehicular lamp according to claim 1, wherein the lamp body and the front lens are designed to be simultaneously fastened by screws.

3. The vehicular lamp according to claim 2, wherein a surface of the front lens is formed to be substantially coplanar with a surface of the flange of the outer bracket.

4. The vehicular lamp according to claim 2, wherein the inner bracket has protrusions that engages with apertures in the outer bracket, while the edge of the side panel at the opening is sandwiched between the outward flange of the inner bracket and the outward flange of the outer bracket.

5. The vehicular lamp according to claim 1, wherein a surface of the front lens is formed to be substantially coplanar with a surface of the outward flange of the outer bracket.

6. The vehicular lamp according to claim 5, wherein the inner bracket has protrusions that engages with apertures in the outer bracket, while the edge of the side panel at the opening is sandwiched between the outward flange of the inner bracket and the outward flange of the outer bracket.

7. The vehicular lamp according to claim 1, wherein the inner bracket has protrusions that engages with apertures in the outer bracket, while the edge of the side panel at the opening is sandwiched between the outward flange of the inner bracket and the outward flange of the outer bracket.

8. The vehicular lamp according to claim 1, wherein the outward flange of the inner bracket and the outward flange of the outer bracket both encircle the entire opening.

\* \* \* \* \*